Figure 1:
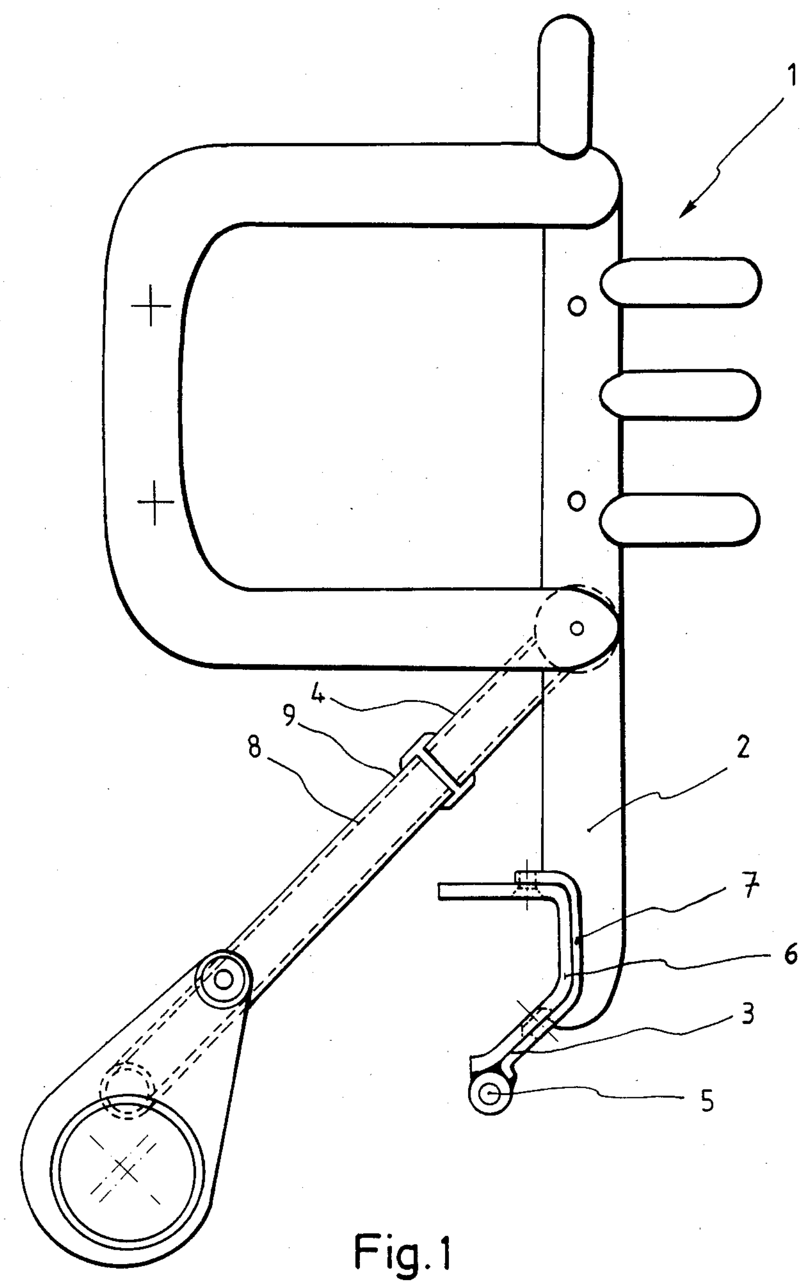

United States Patent [19]

Rumpp

[11] Patent Number: 4,657,294

[45] Date of Patent: Apr. 14, 1987

[54] FRONT GUARD BAR FOR MOTOR VEHICLES

[76] Inventor: Gerhard Rumpp, Schornstrasse 2, D-8084-Inning, Fed. Rep. of Germany

[21] Appl. No.: 716,451

[22] Filed: Mar. 27, 1985

[30] Foreign Application Priority Data

Mar. 28, 1984 [DE] Fed. Rep. of Germany ....... 3411490

[51] Int. Cl.[4] .............................................. B60R 19/04

[52] U.S. Cl. .................................... 293/115; 180/68.6

[58] Field of Search .................. 293/38, 115; 280/762, 280/770; 180/68.6

[56] References Cited

U.S. PATENT DOCUMENTS

| | | | |
|---|---|---|---|
| 2,099,789 | 11/1937 | Baker et al. | 180/68.6 |
| 2,206,444 | 7/1940 | Beckwith | 293/55 |
| 2,273,131 | 2/1942 | Monckmeier | 293/55 |
| 2,537,553 | 1/1951 | Schonauer | 180/68.6 |
| 2,572,477 | 10/1951 | Harden | 293/115 |
| 3,282,368 | 11/1966 | Pittera | 180/68.6 |
| 3,749,436 | 7/1973 | Hitchcock | 293/115 |
| 4,099,760 | 7/1978 | Mascotte et al. | 293/73 |
| 4,411,461 | 10/1983 | Rosenberg | 293/108 |

FOREIGN PATENT DOCUMENTS

| | | |
|---|---|---|
| 0956464 | 1/1957 | Fed. Rep. of Germany . |
| 1846115 | 12/1961 | Fed. Rep. of Germany . |
| 8001667 | 5/1980 | Fed. Rep. of Germany . |
| 8126899 | 2/1982 | Fed. Rep. of Germany . |

*Primary Examiner*—Robert R. Song

*Attorney, Agent, or Firm*—Hubbard, Thurman, Turner & Tucker

[57] ABSTRACT

For vehicles, in particular for cross-country vehicles, a front guard bar is provided, which comprises a tube frame protecting the front part of the vehicle as well as at least one carrier on each side of the vehicle, said carrier being attached to said vehicle. In order to facilitate access to the front part, e.g. when the vehicle is being cleaned, the carriers are arranged such that they are adpated to be inserted into holding devices provided on said vehicle, and the front guard bar is, in addition, releasably connected to said vehicle via respective struts on both sides of said vehicle.

10 Claims, 4 Drawing Figures

1

4
9
8

2

7
6
3
5

FRONT GUARD BAR FOR MOTOR VEHICLES

DESCRIPTION

The present invention refers to a front guard bar for motor vehicles, in particular for cross-country vehicles used for off highway ground transportation, comprising a tube frame protecting the front part of the vehicle as well as at least one front guard bar carrier on each side of the vehicle, said front guard bar carrier being attached to said vehicle.

Front guard bars for cross-country vehicles serve to protect the front part of the vehicle against branches, rock spurs and the like, when the vehicle is used for cross-country drives.

In particular in the case of rough cross-country drives, the lamps located in the front part as well as the radiator grille with the air inlet ports leading to the engine compartment are to be protected in an effective manner. As is generally known, such front guard bars are fixediy secured to the vehicle by means of screw connections. The impact forces acting on the front guard bar are, via the screw connections, directly transmitted to the bumper or to parts of the vehicle frame.

However, these front guard bars, which are fixedly connected to the vehicle, were found to be disadvantageous in so far as, due to said front guard bars, access to the front part of the vehicle is made more difficult. This has the effect that it is difficult to clean the vehicle and to exchange the vehicle lamps. In particular in cases in which additional headlamp protection gratings in the front guard bar are used, it is impossible or hardly possible to clean the vehicle headlamps by removing e.g. insects or the like, which fixedly adhere thereto.

Hence, the invention is based on the task of providing a front guard bar, which is easy to handle and which can be removed from the vehicle without any difficulties.

This task is solved by the features that the carriers are arranged such that they are adapted to be inserted into holding devices provided on said vehicle and that the front guard bar is, in addition, releasably connected to said vehicle via respective struts on both sides of said vehicle.

This solution is simple and economy-priced. It has the advantage that the front guard bar is—just as conventional front guard bars—fixedly connected to the vehicle and guarantees thus effective protection in the open country, said front guard bar being, however, adapted to be rapidly removed from the front part of the vehicle. This has the effect that, e.g. in the case of minor repairs which have to be carried out on the front part of the vehicle, rapid access to said front part is gained. The pins of the two holding devices may have different lengths so as to facilitate insertion during the subsequent operation of remounting the front guard bar.

In order to avoid that the front guard bar has to be removed completely whenever access to the front part of the vehicle is to be gained, it is advantageous that the holding devices provided on the vehicle are designed as halves of a hinge, the front guard bar having attached thereto corresponding halves of a hinge so that the front guard bar is adapted to be pivoted in the direction of driving.

In order to provide the possibility of releasing the struts from the vehicle in a simple manner without there being any necessity of disconnecting any connections on the underside of the vehicle, it is advantageous that there is provided a rapid-release connection means, which consists of an attachment member and of a connection member, the attachment member of said connection means being secured to the vehicle frame and the connection member being connected to one end of the strut. For the purpose of providing a possibility of varying the length of the strut, it is advantageous that one end of the strut has provided therein a threaded hole, a threaded pin, which is fixed to one end of an intermediate member so as to be secured against rotatin, being adapted to be screwed into said threaded hole, the connection member being provided at the other end of said intermediate member.

For the purpose of protecting the length variation means, it is advantageous that a sleeve, which projects beyond the intermediate member end facing the strut, is provided on one end of said strut.

A connection, which connects the connection member provided at said one end of the strut and the attachment member secured to the vehicle frame and which is adapted to be rapidly released and to be easily handled, is provided on the basis of the features that the connection member is provided with an axially displaceable pin, which is secured against rotation and which, in the disconnected condition of the connection means, is moved—due to the effect produced by a disk spring assembly—inwards to an inner end position, in which it projects beyond the intermediate member by a specific length, and into contact with a stop, the projecting end of said pin being provided with at least one lateral protrusion, and that the attachment member is provided with an opening for receiving therein the pin and with a ring-segment-shaped ramp, which is arranged at the end of said opening and the guideway of which faces away from the pin and is provided with at least one lock-in indentation complementary to the protrusion. Due to this structural design of the connection means, it is possible to release a strut from the vehicle and to reattach it to said vehicle simply by rotation the intermediate member by less than one turn.

In order to facilitate rotation of the intermediate member, it is advantageous that said intermediate member has provided therein a cylindrical transverse sleeve extending transversely to the longitudinal axis of said intermediate member so that it is possible to attach a lever to said transverse sleeve for the purpose of rotating the intermediate member.

In this connection it is advantageous that the transverse sleeve has in the interior thereof a constriction, which is provided at the centre of said transverse sleeve, said constriction preventing the lever from projecting beyond the other side of said transverse sleeve and from scratching the paintwork of the vehicle when the front guard bar is being attached.

If the front guard bar is to be attached to the vehicle such that it is not pivotable, but can still be released rapidly and easily by means of lateral displacement transversely to said vehicle, it will be advantageous that, for accommodating the pin and the disk spring assembly, the connection member comprises a cagelike piston and at least one eccentric, which is provided on said transverse sleeve and by means of which the piston can be lowered into the intermediate member by displacement of the piston, said transverse sleeve being adapted to be rotated about its own longitudinal axis.

The struts may be attached to the front guard bar such that they are pivotable so as to facilitate the remounting operation of a front guard bar which has been slightly warped by being used. In order to protect the headlamps of the vehicle against the impact of stones and the like, it will be advantageous to provide the front guard bar with headlamp protection gratings.

Figure 2:
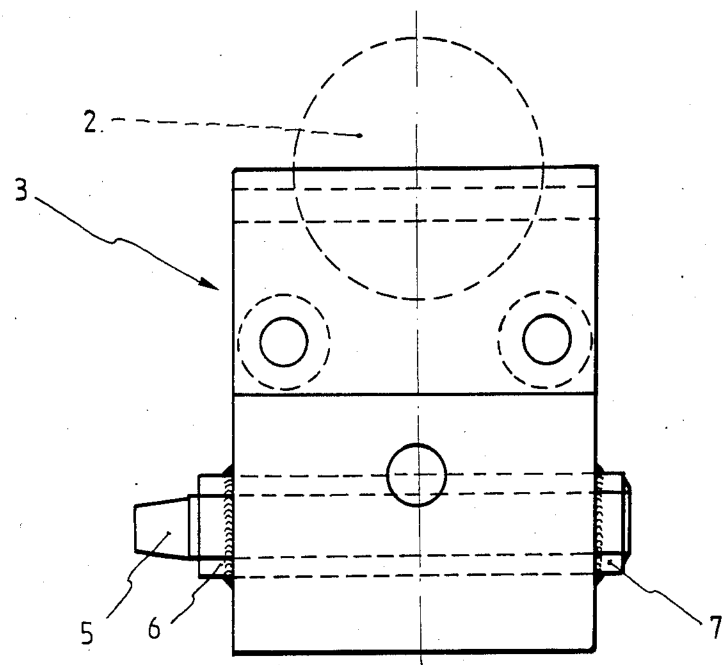
Figure 3:
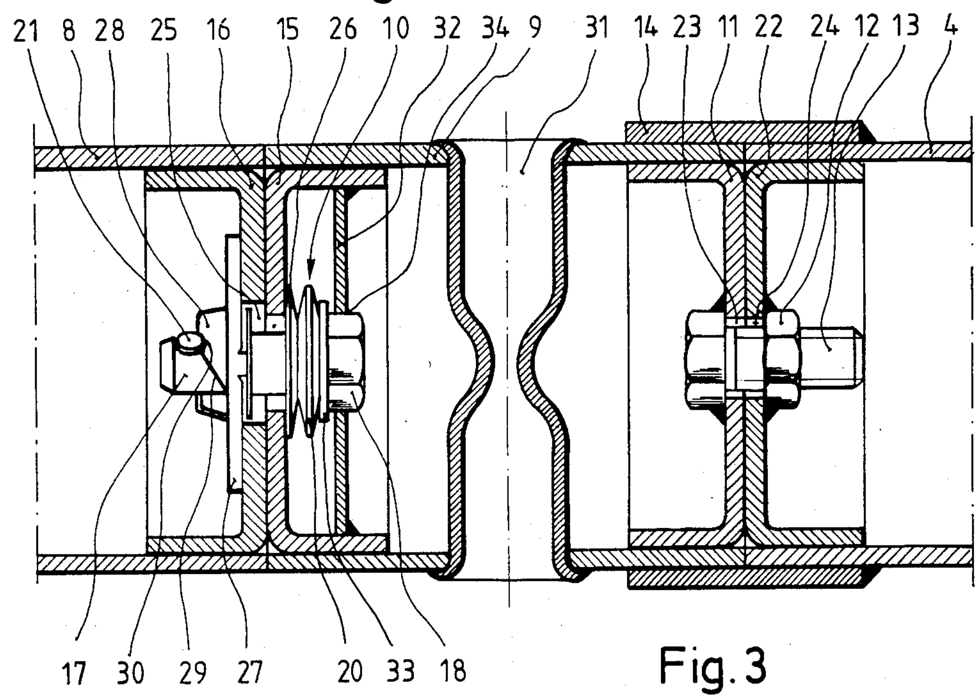
Figure 4:
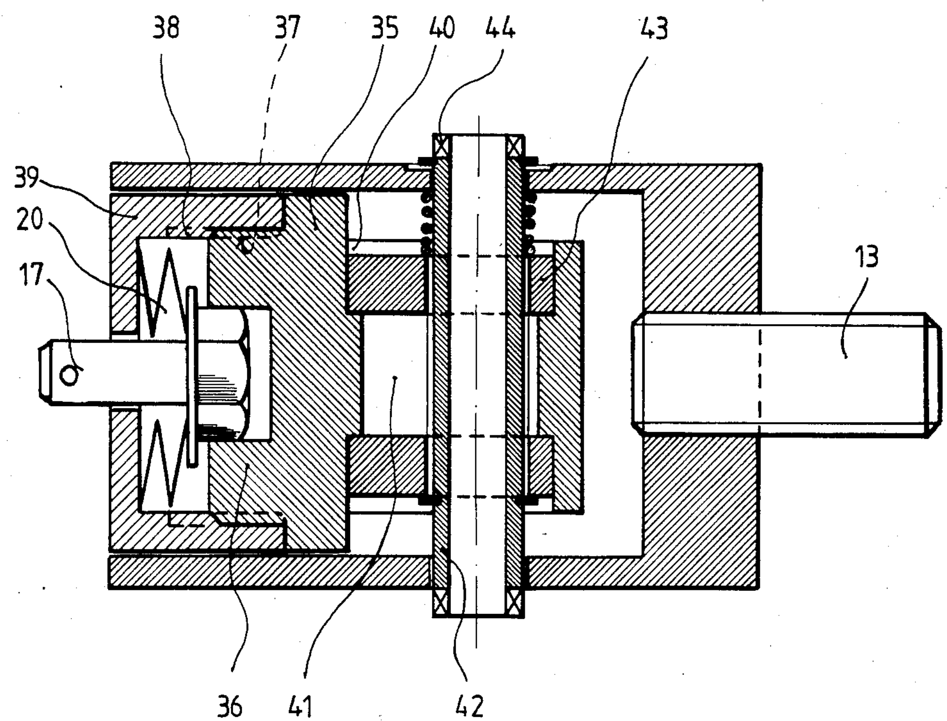

In the following embodiments of the invention will be explained in detail on the basis of drawings, in which FIG. 1 shows, on a reduced scale, a side view of the front guard bar with struts and hinges, FIG. 2 is an enlarged horizontal sectional view taken substantially from the position II—II of FIG. 1;

FIG. 3 is an enlarged longitudinal sectional view of the encircled portion III, IV of FIG. 1; and FIG. 4 is an enlarged longitudinal sectional view of an alternative construction contained within the encircled portion III, IV of FIG. 1.

As can be seen best from FIG. 1, the front guard bar 1 comprises a tube frame provided with carriers 2, which are attached to said tube frame and which are equipped with hinges 3, and with struts 4, which are equipped with intermediate members 9 and with attachment members 8.

A hinge 3 consists of two hinge halves 6 and 7, which are each provided with a sleeve. The hinge halves 6 and 7 are supported by a hinge pin 5 (cf. FIG. 2). The hinge pin 5 is welded into the hinge half 6, which is secured to the vehicle. The hinge half 7, which is welded to the carrier 2, is attached to the free end of the hinge pin 5. The hinge half 6, which is screwed onto the vehicle, is adapted to the vehicle shape at the location of mounting (e.g. the bumper). The two hinge halves 6 and 7 have approximately the same shape and lie on top of each other.

As can be seen from FIG. 3, the connection means between the strut 4 and the vehicle comprises an intermediate coupling member 9 with a connection member 10 and an attachment member 8. The intermediate member 9 is provided with an end plate 11, which is located at the intermediate member end facing the strut 4 and the edges of which are bent and welded to the connection member. The end plate 11 is provided with an opening 23 at the centre thereof, a compensating screw 13 extending through said opening in the direction of the strut 4 and having its screw head welded to the end plate 11. Also the strut 4 is provided with an end plate 22, which is located at the strut end facing the intermediate member 9. This end plate 22 has, at the centre thereof, an opening 24 on top of which a compensating nut 12, which is arranged in the interior of the strut 4, is welded to the end plate 22 in such a way that its axis coincides with the axis of the compensating screw 13. In the assembled condition, the compensating screw 13 is, at least partially, screwed into the compensating nut 12. The gap between the strut 4 having an annular cross-section and the intermediate member 9 having an annular cross-section as well is covered by a sleeve 14, which has an annular cross-section and which is welded to the outside of said strut at the end facing the intermediate member. At the opposite end of the intermediate member 9 the connection member 10 is located. Said connection member 10 comprises an end plate 15, which is welded into the intermediate member 9 and which is flush with the end of said intermediate member 9, said end plate 15 having a circular opening 26 at the centre thereof. This opening has inserted therein a pin 17, the free end of which projects beyond the intermediate member 9 and which is provided with a hexagon head 18 located within said intermediate member 9. The hexagon head side facing the free end of the pin 17 is provided with a stop 33. Between said stop 33 and the end plate 15 a disk spring assembly 20 is located. The hexagon head 18 is guided within a hexagon opening 34 of a plate 32, which is welded to the bent edges of the end plate 15, and is secured against rotation. The free end of the pin 17 is provided with two lateral protrusions 21, which are located opposite to each other and which are arranged transversely to the axis of the pin 17.

The attachment member 8, whose end facing the intermediate member 9 has an annular cross-section, is also provided with an end plate 16, which is flush with the end of said attachment member and the edges of which are bent and welded to the inner side of said attachment member 8. The end plate 16 has, at the centre thereof, a circular opening 25 whose axis concides with the axis of the pin 17 in the assembled condition. From the inner side of the attachment member 8, a disk 27 is screwed or riveted onto the end plate 16 on top of the centre of said opening 25. The disk 27 comprises two ring segment-shaped ramps 28, which are directed towards the interior of the attachment member 8 and which are provided with guideways 29, said guideways 29 having at the end of their ramplike slope two lock-in indentations 30, which are located opposite to each other and which are complementary to the lateral protrusion 21 of the pin 17. The length of one guideway 29 corresponds to a quarter of a circle.

The intermediate member 9 is provided with a transverse tube 31, which is located at the centre between the ends of said intermediate member and which is arranged transversely to the longitudinal axis of said intermediate member and in the interior thereof, said transverse tube 31 penetrating through the wall of the intermediate member and being provided with a constriction at the centre thereof.

A front guard bar 1 of the type described hereinbefore is mounted in the following way. First of all, the attachment members 8 are attached to the vehicle frame by means of connection elements, which are not shown in the present application. This can be done by means of screwing or welding. Subsequently, the hinge halves 6 provided with the hinge pins 5 are screwed onto the bumper of vehicle. The ends of the intermediate member 9, which have provided therein the compensating screw 13, are then screwed onto the struts 4. This connection serves to provide a possibility of varying the length of the strut 4. Hence, it is not necessary that the compensating screw 13 is fully screwed into the compensating nut 12, as shown in FIG. 3, but it is possible that a gap remains between the strut 4 and the intermediate member 9. When the intermediate members 9 have been screwed onto the struts 4, the front guard bar with its hinge halves 7, which are welded to the carriers 2, is slipped onto the hinge pins 5, which have different lengths in the case shown in the present application and which belong to the hinge halves 6 screwed onto the bumper of the vehicle, in such a way that, first of all, the hinge half 7 facing the longer hinge pin 5 is partly slipped onto said hinge pin and that, subsequently, the second hinge half 7 is slipped onto the shorter hinge pin 5. The front guard bar 1 with the two hinge halves 7 is then fully mated with the hinge halves 6. Said front guard bar 1 with its struts 4 can now be pivoted into contact with the attachment members 8. In the course of this process the pins 17, which are provided with the lateral protrusions 21, pass through the openings 25 and the disks 27 of the attachment members 8. At this moment, the stop 33 of the pin 17 still abuts on the plate 32. By means of rotating the intermediate member 9 by a quarter turn with the aid of a lever (e.g. a screw driver) inserted into the transverse sleeve 31 the pin 17 is drawn—contrary to the effect produced by the disk spring assembly 20—in the direction of the attachment member 8 by means of its lateral protrusions ascending along the guideways 29 until said lateral protrusions 21 come into locking engagement with the lock-in indentations 30.

The front guard bar 1 is now attached to the vehicle. The front guard bar removal operation is carried out reversed in order to the mounting operation. However, the attachment members 8 as well as the hinge halves 6 remain on the vehicle. It follows that, when the front guard bar 1 is to be reattached, it is only necessary to slip said front guard bar onto the hinge halves 6 and to secure its struts 4 to the attachment members 8 in the manner described hereinbefore.

For the purpose of eliminating rattling of the hinges 3, which may occur when the vehicle is moving, the connection between the intermediate member 9 and the attachment member 8 is released again and the intermediate member 9 is screwed further into the strut 4 so that the effective length of the strut is reduced. In view of the fact that the two hinge halves 6 and 7 are placed on top of each other, the hinge 3 will be tensioned when the connection between the attachment member 8 and the intermediate member 9 is re-stablished subsequently, said tension having the effect that rattling of the hinges 3 is prevented.

On the basis of FIG. 4, a different embodiment of an intermediate member 9 with an axially displaceable connection member 10 is described. Structural components which are identical with or similar to the above-described structural components will be referred to by identical reference numerals. Unless described differently, the structural components referred to by identical reference numerals have the same effect as in the case of the above-mentioned embodiment. The connection member 10 comprises a piston 35, which is adapted to be axially moved forward and backward in the intermediate member 9 and one end of which has provided therein a hexagon opening 34 for receiving the hexagon head 18 of the pin 17, an external thread 37 being provided on the base 36 surrounding the opening 34. For the purpose of supporting the disk spring assembly 20, an end cap 39, which is provided with an internal thread 38, is screwed onto the external thread 37 of the piston 35. The end cap 39 is provided with a circular opening 26 through which the pin 17 extends.

The part of the piston 35 facing the compensating screw 13 has provided there in two circular indentations 40 arranged in axially symmetrical, opposite relationship. Between these two circular indentations 40, the piston 35 has additionally provided therein a circular opening 41, which, however, has a smaller diameter. A transverse sleeve 42 is passed through the circular opening 41 of the piston 35 transversely to the longitudinal axis of the intermediate member 9. The transverse sleeve 42 has provided thereon two circular disks 43, which are arranged eccentrically and the outer edges of which are located in the circular indentations 40. The part of the transverse sleeve 42 having attached thereto said circular disks 43 is—just as said circular disks themselves—provided with spline teeth so that said circular disks 43 are positively connected with said sleeve 42.

The transverse sleeve 42 is supported in said intermediate member 9 such that it is adapted to be rotated about its longitudinal axis and it is axially fixed by means of locking rings. The circular disks 43 are held in position on the transverse sleeve 42 by means of locking rings or by means of a helical spring between the inner side of the intermediate member 9 and a circular disk 43 in said circular indentations 40. The ends of the transverse sleeve 42 projecting laterally beyond the intermediate member 9 are provided with slots 44 for receiving therein a tool by means of which the transverse sleeve 42 can be rotated about its own axis. It is also possible to provide e.g. a hexagon socket in said transverse sleeve 42, instead of providing said slots.

The following passage contains a description of the mounting operation of a front guard bar with the aid of a connection means according to the second embodiment—as far as said mounting operation differs from the above-mentioned mounting operation. It is now not longer necessary that the carriers 2 of the front guard bar 1 are pivotably mounted in hinges 3 on the vehicle, but it will be sufficient when the vehicle has provided thereon holding devices 3 permitting e.g. lateral insertion, but no pivotal movement. When these holding devices are used, the pin 17 of the connection member 10 of the intermediate member 9 attached to the strut 4 is retracted into said intermediate member 9 to such an extent that the end of said pin is flush with the free end of said intermediate member 9, said retraction being effected by means of rotating the transverse sleeve 42 about its own axis. In order to achieve said flush condition, the eccentric radius of the circular disk 43 is chosen such that it corresponds to half the maximum length by which the pin 17 protrudes beyond the end of the intermediate member 9.

Retraction of the pin 17 by means of rotating the transverse sleeve 42 about its own axis is effected due to the fact that the piston 35 moves along its axis into the interior of the intermediate member 9 due to the rotation of the eccentric circular diks 43. Together with said piston 35 also the end cap 39, which is screwed onto said piston, moves in the same direction. In view of the fact that the pin 17 rests, via the disk spring assembly 20, on the end cap 39, said pin is moved as well.

When the pins 17 of both intermediate members 9 have been retracted, the front guard bar 1 can be laterally slipped onto the holding devices 3. As soon as the intermediate members 9 is alignment with the attachment members 8, the piston 35 and the pin 17 can be extending again by further rotation of the transverse sleeve 42. The end of the piston 17 now projects into the attachment member 8. By means of rotating the intermediate member 9 about its own axis, the connection between the strut 4 and the attachment member 8 is now established in the manner which has been described hereinbefore.

The front guard bar removal operation is carried out in reversed order.

The intermediate member 9 as well as the connection means may consist of sheet steel parts which have been produced by deep drawing or of turned parts.

I claim:

1. A front guard bar for motor vehicles, in particular for cross-country vehicles, comprising a tube frame for protecting the front face of the vehicle, insert hinges (6, 7) connecting the tube frame for pivotal movement toward and away from the front face of said vehicle and means releasably connecting attachment members (8)

on both sides of said vehicle via respective struts (4) connected to said tube frame, characterized in that each strut end facing said attachment member (8) includes a tube-shaped coupling member (9) having an axial threaded fastener (13) adapted to be axially screwed into said strut (4) for length adjusting purposes, said coupling member end facing the strut (4) being surrounded by a sleeve (14) mounted on said strut (4), and there is included means to releaseably connect said respective attachment member (8) to said coupling member via a rapid-release connection means (10).

2. A front guard bar according to claim 1, characterized in that said insert hinges (6, 7) comprise one half (6) of a hinge provided on said vehicle and a corresponding half (7) of a hinge attached to the front guard bar (1) so that the front guard bar (1) is adapted to be pivoted toward and away from the front face of said vehicle.

3. A front guard bar according to claim 1, characterized in that one end of said strut (4) has provided therein a threaded aperture (12), a threaded fastener (13) secured against rotation to one end of said coupling member (9) and adapted to be screwed into said threaded aperture (12) and rapid-release connection means (10) is provided at the other end of said coupling member (9).

4. A front guard bar according to claim 1, chracterized in that a sleeve (14) projects beyond the end of coupling member (9) facing the strut (4), and is mounted on one end of said strut (4).

5. A front guard bar according to claim 1, characterized in that the coupling member (9) includes therein a cylindrical sleeve (31, 42) extending transversely to the longitudinal axis of said coupling member.

6. A front guard bar according to claim 5, characterized in that the transverse sleeve (31) includes an interior constriction substantially at the center of said sleeve.

7. A front guard bar according to at least one of the claims 1 to 6, characterized in that the rapid-release connection means (10) includes an axially displaceable pin (17) secured against rotation, a spring assembly (20) which when said rapid-release connection means is disconnected is operative to bias said pin (17) inwards into an inner end position, to project beyond the coupling member (9) by a predetermined length, and into contact with a stop (33), the projecting end of said pin (17) including at least one lateral protrusion (21), said attachment member (8) including an opening (25) in which to receive the pin, a ring segment-shaped ramp (28) arranged at the edge of said opening (25) and a guideway (29) facing away from the pin (17) and including at least one lock-in recess (30) in which to receive the protrusion (21).

8. A front guard bar according to claim 7, characterized in that for accommodating pin (17) and spring assembly (20), the rapid-release connection means (10) comprises a cagelike piston (35) and at least one eccentric (43), mounted on said transverse sleeve (42) for positioning said pin (17) into the coupling member (9) by displacement of the piston (35), said transverse sleeve (42) beng supported for arcuate displacement about its own longitudinal axis.

9. A front guard bar according to claim 1, characterized in that the struts (4) are attached to the front guard bar (1) such that they are relatively pivotable.

10. A front guard bar according to claim 1, characterized in that the front guard bar (1) is provided with headlamp protection gratings.

* * * * *